United States Patent [19]

Van der Veen

[11] Patent Number: 5,226,061
[45] Date of Patent: Jul. 6, 1993

[54] TRANSMITTERS AND TRANSMITTER CIRCUITS

[75] Inventor: Albertus C. Van der Veen, Hextable, England

[73] Assignee: Hi-Trak Systems Limited, Surrey, England

[21] Appl. No.: 590,265

[22] Filed: Sep. 28, 1990

[30] Foreign Application Priority Data

Sep. 30, 1989 [GB] United Kingdom ............ 8922095

[51] Int. Cl.$^5$ ............................................. H04L 27/20
[52] U.S. Cl. ..................................... 375/68; 342/385; 375/70; 455/127
[58] Field of Search .............. 375/68, 70; 455/116, 455/98, 127; 340/539; 342/385

[56] References Cited

U.S. PATENT DOCUMENTS 3,299,356  1/1967  Bornhorst et al. .......... 375/70 X

FOREIGN PATENT DOCUMENTS 2046529  11/1980  United Kingdom .

Primary Examiner—Curtis Kuntz
Assistant Examiner—Tesfaldet Bocure
Attorney, Agent, or Firm—Blum Kaplan

[57] ABSTRACT

The invention relates to small low voltage transmitters for transmitting at a single frequency, preferably in the VHF range, suitable for use in the location or tracking of birds, animals, vehicles, people or other objects where the transmitter is required to be small and light. The transmitter circuit includes an oscillator stage (61) based on a crystal oscillator XL1 having a predetermined nominal frequency, a frequency multiplying and amplifying circuit (62) arranged to double the nominal frequency and pulsing circuit (60) designed to give a pulsed output at a predetermined frequency, the pulsing stage (60) includes a pair of transistors TR11, TR12 having effective negative resistance, which transistors are separate from the transistor TR3 in the oscillating circuit and which are off during an Off Period and on during an On Period, with the Off to On period in the ratio of at least 15 to 1. The oscillator circuit (61) includes a tuning capacitor C3 by which the tolerances of the crystal frequency and other components of the oscillator stage can be compensated. The frequency multiplying and amplifying circuit (62) includes a distinct tuning capacitor (66) by which the final desired frequency of the amplifier stage can be tuned to compensate the component tolerances in the amplifying stage. The transmitter circuit together with batteries (30) are located in a casing (18, 20) all of which components weigh no more than 7 grams.

15 Claims, 5 Drawing Sheets

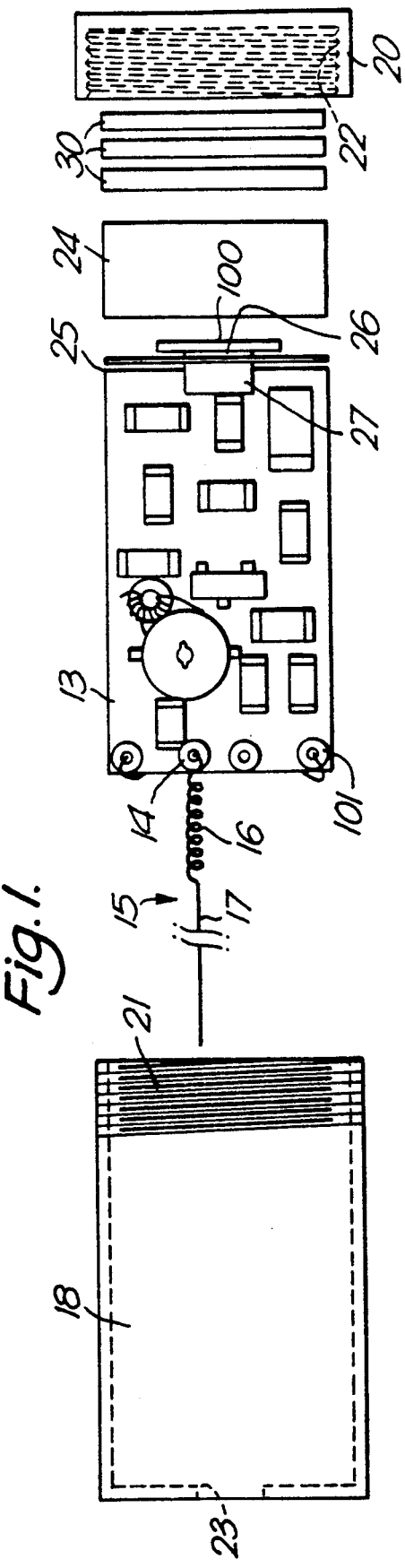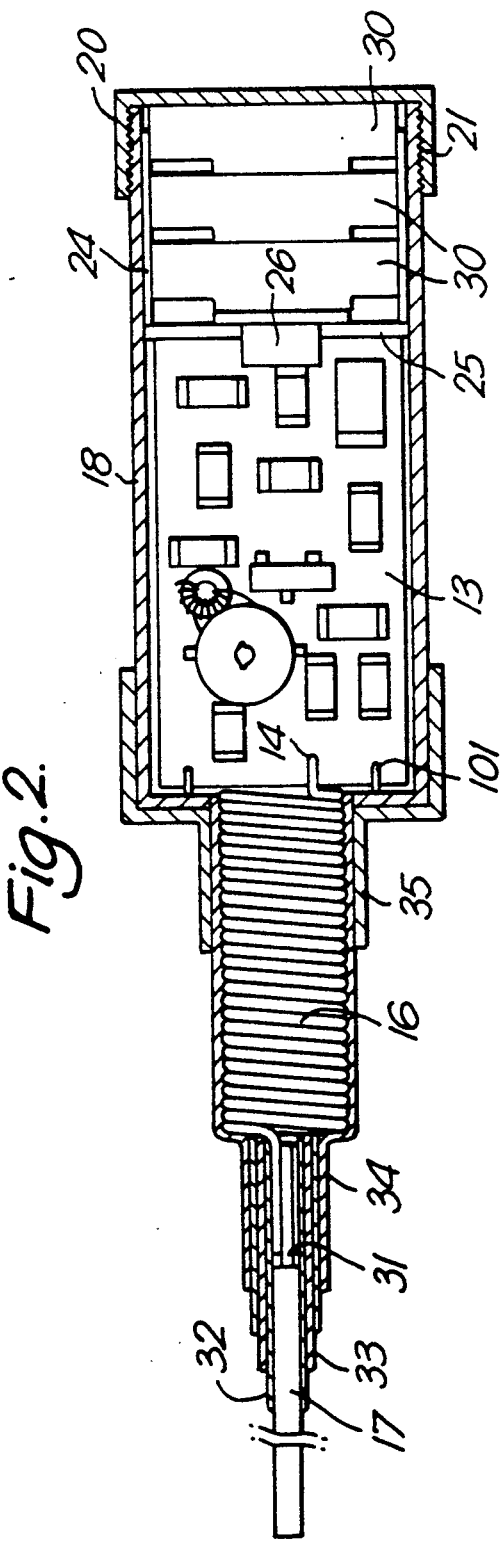
Fig. 1.
Fig. 2.

TRANSMITTERS AND TRANSMITTER CIRCUITS

BACKGROUND OF THE INVENTION

This invention relates to transmitters and particularly to small, low voltage (1.5 to 6 volts nominal) transmitters for transmitting at a single selected frequency, normally (but not essentially) at a very high frequency (VHF), that is greater than 30 MHz.

In the design of transmitters which are used for the location or tracking of birds, animals, vehicles, people or other objects it is desirable to use as small and light a transmitter as is possible.

The invention is particularly concerned with transmitters for use in the sport of falconry. For such sport it is common for small transmitters to be attached to hunting birds in order that they can be tracked and located if lost or out of sight. For this use it is particularly important that the transmitters are small and light while remaining capable of emitting as strong a signal as possible. It is also desirable that their active life is of several days (at least four).

The frequencies used for this sport are designated in each country in which it is praticed. In the UK the legal frequency granted by the government is approximately 173-174 MHz. In USA, Canada, Europe and the Middle East the frequency alloted for falconry is approximately 216 MHz. In Germany frequencies of 151 to 155 MHz and 403 to 405 MHz are also used.

The transmitter circuit is usually based on a crystal oscillator having a predetermined nominal frequency, a frequency multiplying and amplifying circuit and a pulsing circuit designed to give a pulsed output at the predetermined frequency. The transmitters normally have a power less than 50 milliwatts and are driven by batteries at 3 or 4.5 volts nominal.

The transmitter circuit most commonly used at present in falconry is that shown in FIG. 6. In this circuit the crystal oscillator stage O oscillates at a frequency approximately one third that required (216 MHz) and a frequency multiplying circuit stage M is arranged to triple the frequency. This known circuit has a pulsing stage P providing an OFF period in which no signal is transmitted and an ON period in which a signal is transmitted. The OFF period is defined basically by a capacitor charging up through a resistor and the ON period by the same capacitor discharging through another resistor and a transistor which forms part of the oscillator stage. For this known circuit to function correctly a good DC gain characteristic is required for the transistor. For efficient oscillation, however, that transistor also needs to have a good gain characteristic at the crystal frequency. These requirements are often conflicting and the result is a wide amptitude variation of output signal from the oscillator stage and thus from the transmitter. The frequency tripling stage, mentioned above, is chosen so that the oscillator stage can function at a lower frequency where it is possible to obtain transistors with a sufficient DC gain to operate the pulsing circuit, but this is less efficient than, for example, a frequency doubling circuit. There is no means for tuning the frequency once assembled.

An object of the present invention is to provide a more efficient transmitter circuit which will provide a higher output power for less battery power, which is small and light and which is preferably reproducable from one example to another using standard components.

SUMMARY OF THE INVENTION

Accordingly, the present invention provides a low voltage, single frequency, transmitter circuit comprising an oscillator stage including a crystal oscillator having a predetermined nominal frequency and a first transistor, a frequency multiplying and amplifying stage arranged to multiply and amplify said nominal frequency, and a pulsing stage, characterised in that the frequency multiplying circuit is arranged preferably to double the frequency, and the pulsing stage comprises at least a second transistor distinct from the first transistor, which second transistor is switched off during an OFF period when there is no output and is switched on during an ON period and in which the OFF to ON period is in the ratio at least 15:1 preferably 20:1.

This gives greater efficiency and minimises the current drawn. Preferably the on pulse width is in the range 40 to 70 millisec.

Preferably the pulsing circuit comprises two transistors each of which is switched off during the OFF period. Alternatively a unijunction transistor is used. Preferably these have effective negative resistance and therefore a fast action. This gives a sharp narrow pulse.

With advantage the oscillator circuit includes a tuning means, preferably a variable capacitor, by which the tolerances of the crystal frequency and other components of the oscillator stage can be compensated. This allows the frequency to be accurately adjusted after assembly so that each transmitter made from standard components has the required frequency. Also it allows the output for the oscillator circuit to be maximised.

The output from the at least second transistor of the pulsing stage is connected to the crystal oscillator via a resistor whose value is selected to cover all variations of the gain specification of the transistor of the oscillator circuit. The transistor of the amplifying stage is preferably biased on.

The components forming the frequency multiplying and amplifying stage also have tolerances which separately introduce inaccuracies in the output frequency compared with the required nominal frequency. Preferably this circuit also includes tuning means, distinct from the tuning means in the oscillating circuit, whereby the final desired frequency of the amplifier circuit can be tuned to compensate for component tolerances thus causing the output power and the efficiency to be maximised.

Another important aspect of the circuit which may be claimed independently is that the transmitter is directly connected to an antenna, without the use of an intervening transmission line, and the output impedance of the amplifier stage is matched to the antenna impedance in the range 10-30 ohms.

Preferably the voltage variation in the pulsing circuit is in the range ⅓ to ⅔ the supply voltage + or −20%.

The embodiments of circuit described by way of example are provided on a circuit board of 12-15 mm length and 8 mm wide, located in a casing of less than 2500 cu mm volume with the whole transmitter weighing less than 7 grams.

BRIEF DESCRIPTION OF THE DRAWINGS

Embodiments of transmitter circuit with antenna and casing, in accordance with the invention, will now be described, by way of example only, with reference to the accompanying drawings of which:

FIG. 1 is a exploded side view of the parts of a transmitter and antenna ready for assembly, FIG. 2 is a sectional view of the parts assembled

DETAILED DESCRIPTION OF PREFERRED EMBODIMENTS

Figure 3:
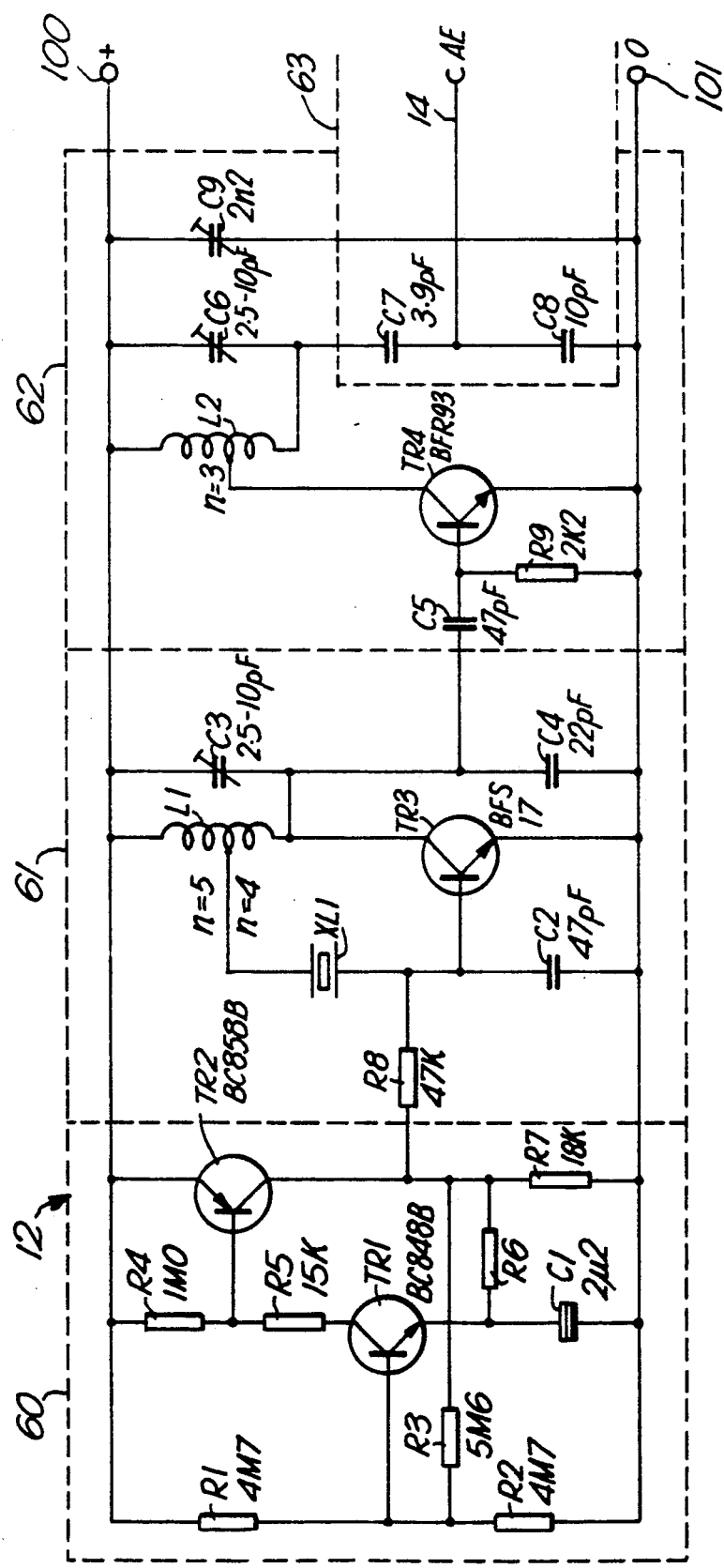
FIG. 3 is a diagram of one embodiment of transmitter circuit.

The transmitter circuit 12 is located on a printed circuit board 13 having an output terminal 14 to which the antenna 15 comprising a coiled section 16 and a straight wire portion 17 is connected. The transmitter has a casing comprising an aluminum cylindrical body 18 and a cap 20. The body is open at one end the exterior surface of which is threaded at 21 and the cap is internally threaded at 22 to screw over the open end. The base of the body 18 is formed with a central circular aperture 23 through which the antenna projects. The transmitter casing for example is of length 27 mm and external diameter 10 mm. The transmitter has additionally an insulating sleeve 24, an insulating washer 25 and a battery connector 26 which comprises a stud 27 extending through the washer and defining a slot into which the end of the printed circuit board is pushed. Three batteries 30, each of 1.5 volts nominal, are located in the casing between the battery connector and the end of the cap and are surrounded by the insulating sleeve 24.

To assemble the transmitter, with the antenna connected to the printed circuit board, the circuit board is slid into the body 18 of the casing until it is fully against the base of the body. The insulating sleeve 24 is then slid against the washer 25 to cover the inside of the body for the length of the battery compartment. Five layers 31, 32, 33, 34, 35 of insulating heat shrink material are then placed over the antenna coil portion 16 and the base of the body 18 starting with the smallest first, as seen in FIG. 2. These may include adhesive. The batteries are located in the battery compartment and the cap is screwed onto the casing body. The whole transmitter, casing and batteries, may be made to weigh as little as 7 grams and have a volume less than 2500 cu mm.

In this example the transmitter had a frequency of 216.1 MHz, and an output impedance of approx 22 ohms (10 to 30) to match the antenna radiation resistance. The coiled wire portion of the antenna has the following dimensions: 29 turns of enamalled copper wire 0.56 mm diameter, 15 mm length, an internal dimension of 3.5 mm diameter (an inductance of about 700 nH). The straight wire was made of 7/0.2 mm stainless steel cable, having a 185 mm length. The capacitance of the wire at this frequency is approximately 2.5 pF. The straight wire portion can be made from steel or copper or alloys of these and can be twisted or solid and insulated or not. The electrical length of the coiled wire portion was approx. 52° (Theoretical split 22° for the straight wire and 30° for the transmitter casing).

The first embodiment of transmitter circuit, as seen in FIG. 3, is designed to transmit at 216.1 MHz. The circuit has positive and negative terminals 100, 101 respectively at 4.5 volts nominal and zero voltage, the terminals being connected through the battery connector to the batteries 30. Resistors R1 and R2, both 4M7, are connected in series between the terminals 100, 101. Resistor R4, 1M0 has one end connected to terminal 100 and the other end connected to one end of a resistor R5, 15K, the other end of which is connected to the collector of a transistor TR1, BC 848B, the base of which is connected to the junction of R1 and R2 and the emitter of which is connected through capacitor C1, (2µ2), to terminal 101. the transistor TR2, BC858B, has its emitter connected to terminal 101, its base connected to the junction of R4 and R5 and its collector connected via a resistor R7, 18K, to the terminal 101. A resistor R3, 5N6, is connected between the junction of R1 and R2 and the junction of R7 and the emitter of TR2. A resistor R6, 82OK is connected between the junction of R7 and TR2 and the junction of C1 and TR1. The value of this resistor will vary dependent on the voltage of the batteries. In a modified version having only 3 volts of power R6 would be 680K. A crystal XL1 having a natural frequency of approximately 108 MHz has one side connected through a capacitor C2, 47 pF, to the terminal 101 and the other side connected to an intermediate point of an inductance L1 one side of which is connected to terminal 100 and the other end of which is connected to the collector of a transistor TR3, BFS17. The emitter of TR3 is connected to the terminal 101 and its base is connected to the junction of crystal XL1 and C2, this junction also being connected via a resistor R8, 47K, to the junction of R7 and transistor TR2. A variable capacitor C3, (2.5 to 10 pF) has one side connected to terminal 100 and the other side connected via a capacitor C4, 22 pF, to the terminal 101 and also to the junction of L1 and TR3. The transistor TR4, BFR 93, has its emitter connected to terminal 101, its base connected via a resistor R9, 2K2 to terminal 101 and also via a capacitor C5, 47 pF, to the junction of C3 and C4 and its collector connected to an intermediate point of an inductance L2. The inductance L2 has one end connected to terminal 101 and the other end connected via a variable capacitor C6, 2.5 to 10 pF, to terminal 100 and also via capacitor C7, 3.9 pF, and capacitor C8, 10 pF, in series to the terminal 101. Capacitor C9, (2N2), acting as a radio frequency decoupler extends between the terminals 100, 101 and the output terminal 14 of the transmitter is connected to the junction between capacitors C7 and C8.

Each of the inductancies L1 and L2 comprises a powder iron toroidal core with 0.1 mm enamel copper wire winding. Inductance L1 has its intermediate point connected to the crystal XL1 having 5 turns on the side connected to terminal 100 compared with 4 turns connected to transistor TR3. Inductance L2 has its intermediate point connected to TR4 with 3 turns on either side.

The transmitter circuit consists of four basic stages—a pulsing stage 60, an oscillator stage 61, a frequency doubler and amplifier stage 62, and an antenna AE matching circuit 63.

The pulsing circuit consists of TR1 and TR2 and associated components. TR1 and TR2 are a complementary pair and are both either conducting or switched off. When conductive the voltage on the base of TR1 is approximately ⅔ the supply voltage VS, because R3 is in parallel with R1. C1 is charging up towards VS through R3 and TR2. When the voltage at the emitter of TR1 is similar to that at its base, TR1 and TR2 both switch off. The voltage at the base of TR1 is now about ⅛ VS because R3 is now in parallel (through R7) with R2. C1 discharges through R6 towards 0 volts. When the voltage at the emitter of TR1 falls to about ⅛ VS, TR1 switches on again and the action is repeated. The active area of voltage variation is between ⅛ and ⅝ VS (+ or −20%) and the potential divider R1, R2, R3 is made up of high value resistors (greater than 100K and preferably greater than 800K) compared with the value of R5 and R7 (ratio > 10). This reduces the current drawn from the batteries and contributes to their longer life by increasing the linearity of the charge rate and isolating the sagging effects of the voltage supply caused by the pulsing. Preferably R1, R2 and R5 have similar values. The timing is determined by C1 in combination with R5 and R6. C1 and R5 basically determine the ON period, and C1 and R6 determine the OFF period. Both TR1 and TR2 are switched off during the OFF period thus minimising the total current drawn. Preferably the circuit is arranged to have a pulse length (ON time) of about 50 milliseconds (+ or −20%) with a 20:1 off/on ratio (+ or −20%).

With the separate pulsing circuit of this invention, having two transistors each independent of the oscillator stage transistor, the oscillator transistor can be chosen for efficiency at the crystal frequency. This allows both higher efficiency in the oscillator stage and flexibility in the ON/OFF ratios. Varying R5 to change the ON time has little effect on the OFF time and varying R6 to change the OFF time has little effect on the ON time so the ratio of OFF and ON times can be selected up to about 100:1. Preferably the oscillator circuit is located on one side of the circuit board and the pulsing circuit on the other side.

The crystal oscillator is based on the "Pierce Harmonic" circuit. This circuit oscillates at half the required output frequency of the transmitter. L1 and C3 form a tuned circuit and the feedback, via XL1, is taken from a tapping on L1. C3 being a variable capacitor allows tuning of the circuit to tune out the tolerances of the crystal and more particularly tolerancies in L1. This achieves ability to accurately set the frequency and maximum efficiency. Each model can be tuned to the desired frequency using standard components.

Figure 6:
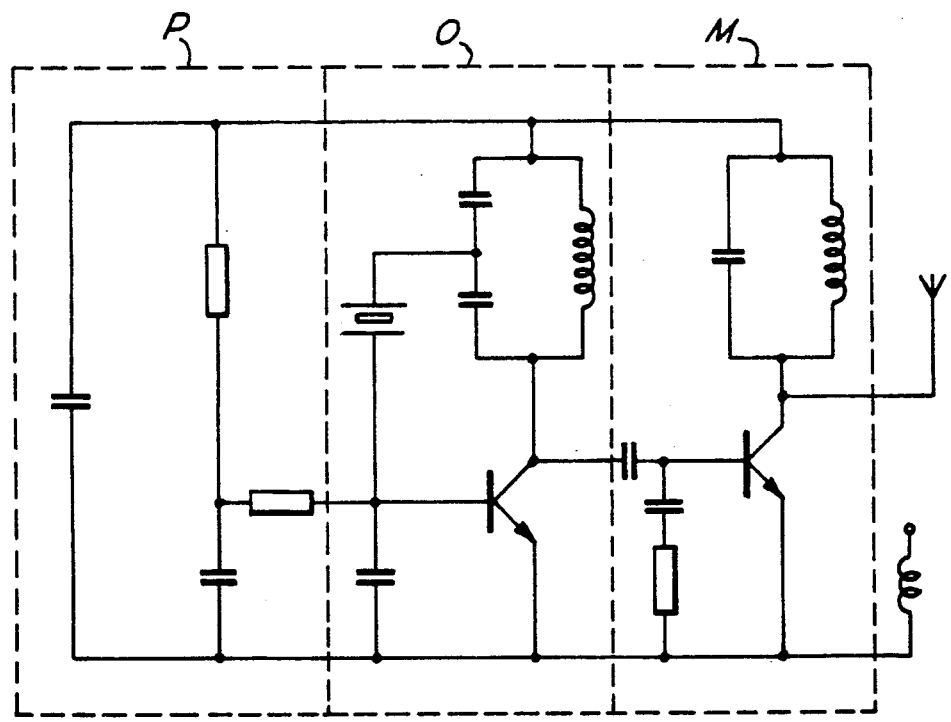
FIG. 6 is a circuit diagram of a prior art transmitter circuit.

By comparison the prior art design of FIG. 6 does not have an ability to tune at this stage and the feedback is taken from the junction of two series capacitors forming the tuned circuit with an inductor.

The frequency doubler and amplifier stage 62 includes the circuit around transistor TR4 and has the two functions of frequency doubling and amplifying the output. L2 and C6 form a tuned circuit at the final desired frequency and select the second harmonic of the signal presented to TR4. This stage is tuned by variable capacitor C6 in order to take out the tolerances of the components (in this stage), and thus achieve maximum efficiency.

In order to achieve antenna matching, the output impedance of the first amplifier stage is adjusted by the ratio of C7 and C8 so as to match the antenna impedance. With the design of this invention the output impedance is required to be matched to the antenna impedance and the antenna is effectively tuned to compensate for the lack of a good ground plane. In known designs the antenna is taken directly from the output tuned circuit. This is a relatively high impedance but in the absence of a good ground plane, this gives a better overall radiated power than matching to the normal quarter wavelength antenna.

The transmitter circuit thus contains two separate tuning systems. The capacitor C3 can be varied to tune the crystal to the exact required frequency to take out the tolerances of the crystal oscillator circuit. The capacitor C6 can be varied thereafter for fine tuning to take out the tolerances of the components in the multiplying and amplifying stage.

Figure 4:
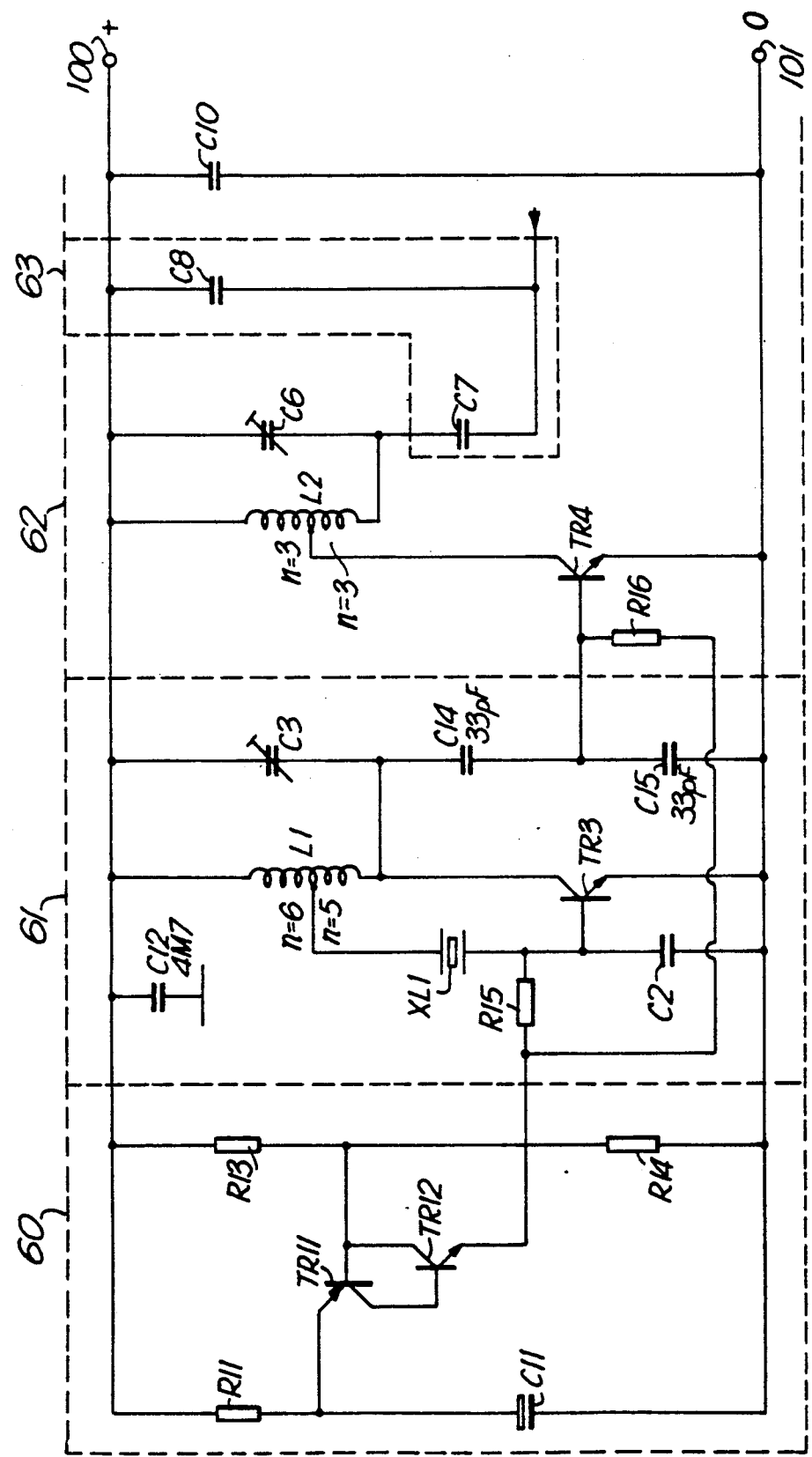
FIG. 4 is a diagram of an alternative form of transmitter circuit.

A modified transmitter circuit is shown in FIG. 4. This is substantially the same in operation as the circuit of FIG. 3 and like parts have been given like reference numerals and will not be redescribed.

The pulsing stage of the FIG. 4 circuit has been achieved with fewer parts, namely only 4 resistors 2 transistors and 1 capacitor, allowing the size of the circuit to be reduced.

In this modified pulsing circuit, a resistor R11 (1M2) and a capacitor C11 (1 μF) are arranged in series between positive and negative voltage sources 100, 101. Transistors TR11 and TR12 (respectively BC858B and BC848B) have been arranged as a four layer semiconducting device known as a Unijunction Transistor which has effective negative resistance. TR11 and TR12 are connected as shown between the junction of R11 and C11 and the junction of resistors R13 (2K2) and R14 (10K) which are connected in series between 100 and 101.

The emitter of TR12 is connected through R15 (20K) to the crystal oscillator and through R16 (10K) to the base of transistor TR4. The value of R15 has been chosen to cover all variations of the gain specification of the transistor TR3.

When the circuit is switched on the capacitor C11 charges through resistor R11 and when the emitter potential of TR11 becomes higher than its base potential transistor TR11 starts to conduct. In so doing the collector of TR11 endeavours to rise towards the emitter potential and turns the base of transistor TR12 positive which causes it to conduct. When TR12 starts to conduct it turns the base of TR11 negative so setting up a regenerative action. Capacitor C11 then discharges through resistors R15 and R16. The combination of transistors TR11 and TR12 thus provide a fast acting switch with the point of switching set by the ratio of R13 and R14. The OFF time while C11 is charging up is dictated by the values of R11 and C11 and the ON time when C11 is discharging through R15 and R16 is determined by the values of C11 and R15 and R16.

The positive pulse produced by charging of C11 through R11 starts the oscillator and puts a bias on the transistor TR4 of the amplifier circuit. Because of the effect of a negative resistance of the transistor combination TR11 and TR12 the switch action is fast acting producing a narrow steep sided positive pulse, for example having a width of 40 to 70 millisecs.

The antenna matching circuit C7 (3p9) and C8 (10p) is now connected to the line 100 and C9 replacd by C10 (4n7).

Figure 5:
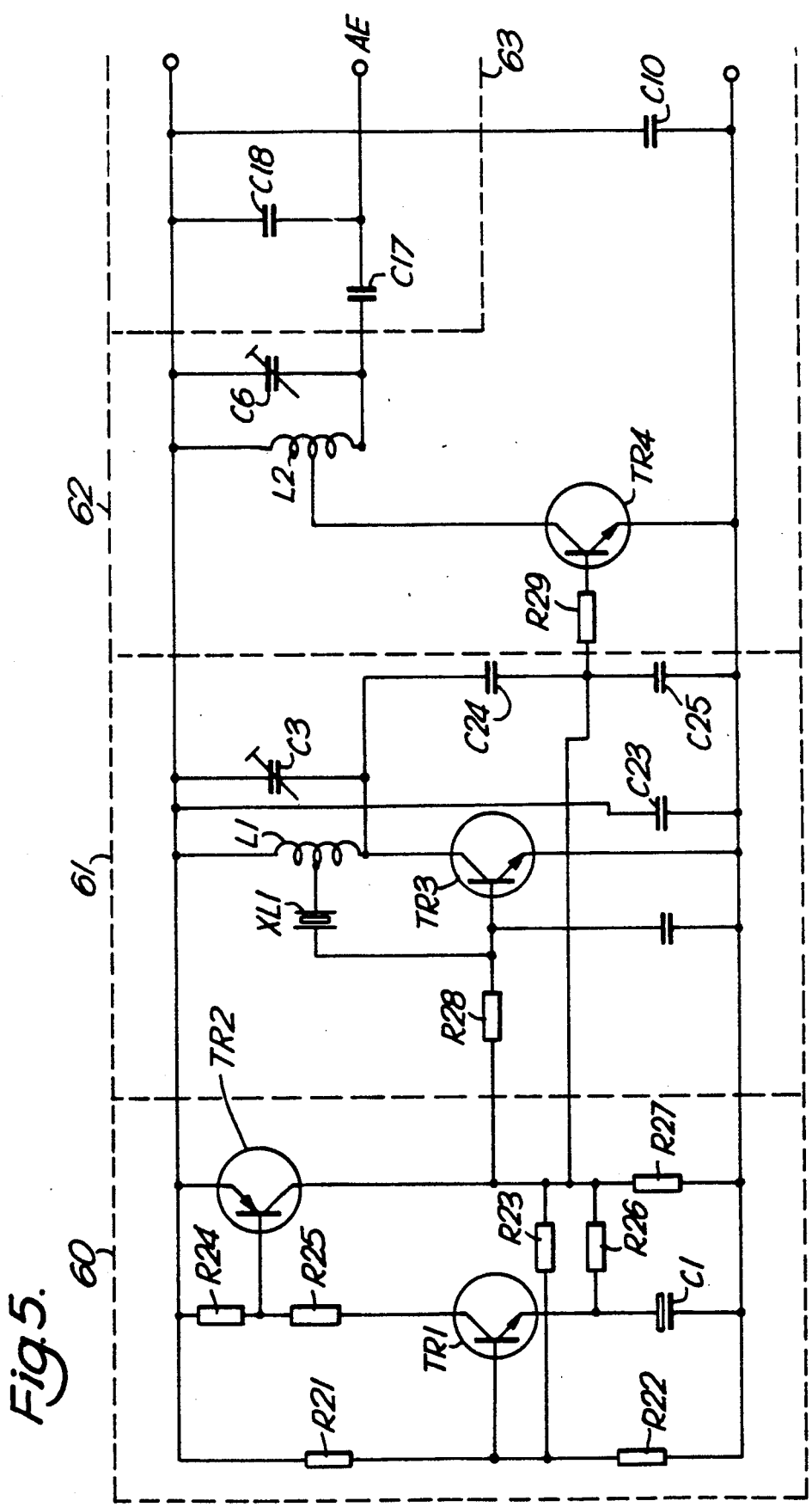
FIG. 5 is a diagram of a further alternative form of transmitter circuit.

A further modified transmitter circuit is shown in FIG. 5, this being essentially a combination of the pulsing circuit of FIG. 3 with the oscillator stage, amplifying and multiplying stage and antenna matching stage of FIG. 4 with variations and with different component values. Where the function is essentially the same as in the previous circuits this will not be described again.

In the pulsing circuit resistors R21 to R28 function similarly to resistors R1 to R8 and have the values R21

820K, R22 1M2, R23 1M2, R24 1M2, R25 47K, R6 1M2, R7 18K, and R8 47K. This has the same reduced current usage advantage as the FIG. 3 circuit.

In the amplifying and multiplying stage R29 of 18K replaces R9 and is connected between the base of TR4 and the junction of R23 and R26. This acts to slighty bias the base of TR4 on so that it acts as a class A amplifier instead of a class C (self biased) amplifier as in the FIG. 3 circuit. This increases the second order distortion effect. C4, C5 have been replaced by C24 and C25 (each 33pF) in series with each other between C3 and terminal 101, with the base of TR4 connected between the junction of C24 and C25. C23 (4n7) connected between terminals 100, 101 provides an additional radio frequency decoupler in the oscillating stage.

Transistor TR3 is of type BFR92A and transistor TR4 is of type BFR92, 92A or 93 having a DC current gain in the range 40–200. This provides more reliable switching with the circuit values (R8 greater than 30K) required for achieving the required short pulse.

The output stage is the same as that for FIG. 4.

A transmitter in accordance with these circuits used with 4.5 volts nominal batteries has been found to transmit for seven days, as compared with about thirty six hours for the prior art circuit of FIG. 6, and at a greater radiated output power.

What is claimed is:

1. A transmitter circuit for transmitting an output signal at a single frequency above about 150 MHz in response to a voltage supplied by a low voltage source, the transmitter having On Periods during which it transmits the output signal and Off Periods between said On Periods during which it transmits no signal, the transmitter circuit comprising an oscillator stage, the oscillator stage comprising a power supply terminal, an earth terminal, a crystal oscillator having first and second crystal terminals and a predetermined nominal frequency, a first transistor having a base, an emitter and a collector, a coil with a tapping point, a tuning capacitor and a further capacitor, the first crystal terminal being connected to the tapping point on the coil and the second crystal terminal being connected to the base of the first transistor and through the further capacitor to the earth terminal, the coil being connected between the power supply terminal and the collector of the first transistor, the emitter of the first transistor being connected to the earth terminal, the tuning capacitor being connected in parallel with the coil, such that the oscillator will give said output signal from the collector of the first transistor and in which there is no tuning coil in parallel with the crystal; a frequency multiplying and amplifying stage connected to the oscillator stage for multiplying and amplifying said nominal frequency; a pulsing stage comprising at least a second transistor connected to the power supply terminal and the oscillator stage, the pulsing stage being arranged to produce a pulse during On Periods and no pulses during Off Periods and to supply the pulses through a resistor to the base of the first transistor; and in which the at least second transistor is switched off during the Off Periods and is switched on during the On Periods.

2. A transmitter circuit for transmitting an output signal at a single frequency in response to a voltage supplied by a low voltage source having terminals, the transmitter having On Periods during which it transmits the output signal and Off Periods between said On Periods during which it transmits no signal, the transmitter circuit comprising an oscillator stage including crystal oscillator having a predetermined nominal frequency and a first transistor connected to the crystal oscillator and to receive voltage from the voltage source, a frequency multiplying and amplifying stage connected to the oscillator stage arranged to multiply and amplify said nominal frequency and a pulsing stage connected to the oscillator stage and comprising at least a second transistor effectively connected to the first transistor and connected to the terminal of the low voltage source to receive voltage, the pulsing stage being arranged to produce a pulse during On Periods and no pulse during Off Periods and to supply said pulses to the oscillator stage, in which at least second transistor is switched off during the Off Periods and is switched on during the On Periods, and in which the ratio of the Off Periods to the On Periods is at least 15 to 1.

3. A transmitter circuit for transmitting an output signal at a single frequency in response to a voltage supplied by a low voltage source, the transmitter having On Periods during which it transmits the output signal and Off Periods between said On Periods during which it transmits no signal, the transmitter circuit comprising an oscillator stage including a crystal oscillator having a predetermined nominal frequency and a first transistor connected to the crystal oscillator and to receive voltage from the voltage source, a frequency multiplying and amplifying stage connected to the oscillator stage and arranged to multiply and amplify said nominal frequency and a pulsing stage connected to the oscillator stage and comprising at least a second transistor effectively connected to the first transistor and to receive voltage from the low voltage source, the pulsing stage being arranged to produce a pulse during On Periods and no pulse during Off Periods and to supply said pulses to the oscillator stage, in which the at least second transistor is switched off during the Off Periods and is switched on during the On Periods, and in which the ratio of the Off Periods to the On Periods is at least 15 to 1 and in which the pulse width is in the range 40 to 70 miliseconds.

4. A transmitter circuit according to claim 1 or claim 3 in which the at least second transistor comprises a pair of transistors connected to one another having effective negative resistance and each of which is switched off during the Off Periods.

5. A transmitter circuit according to claim 1 in which the at least second transistor comprises a uni-junction transistor having effective negative resistance.

6. A transmitter circuit according to claim 1 in which the tuning capacitor enables the frequency of the oscillator circuit to be adjusted to compensate for tolerances of the crystal, the first transistor, the coil and the further capacitor of the oscillator stage.

7. A transmitter circuit according to claim 6 in which the frequency multiplying and amplifying stage includes a second tuning means for adjusting the frequency of the amplifying and multiplying stage to compensate for tolerances in circuit components forming the multiplying and amplifying stage.

8. A transmitter circuit according to claim 1 in which the frequency multiplying circuit is arranged to double the frequency.

9. A transmitter circuit for transmitting an output signal at a single frequency in response to voltage supplied by a low voltage source having terminals, the transmitter having On Periods during which it transmits the output signal and Off periods between said On Periods during which it transmits no signal, the transmitter circuit comprising an oscillator stage including a crystal oscillator having a predetermined nominal frequency and a first transistor connected to the crystal oscillator and to receive voltage from the voltage source, a frequency multiplying and amplifying stage connected to the oscillator stage and arranged to multiply and amplify said nominal frequency and a pulsing stage connected to the oscillator stage and comprising a second transistor and a third transistor connected as a unijunction pair of transistors, effectively connected to the first transistor and to receive voltage from the voltage source, the pulsing stage further comprising a capacitor and a first resistor connected in series between the terminals of the voltage source and connected to one another via a connection which is further connected to the emitter of the second transistor, the emitter of the third transistor being connected through a second resistor to the base of the first transistor, a third resistor and a fourth resistor connected in series between the terminals of the voltage source and connected to one another via a connection further connected to a base of the second transistor, so that the pulsing stage is arranged to produce pulses during On Periods and no pulses during Off Periods and to supply said pulses to the oscillator stage, in which the at least second transistor is switched off during the Off Periods and is switched on during on the On Periods.

10. A transmitter circuit for transmitting an output signal at a single frequency in response to a voltage supplied by a low voltage source, the transmitter having On Periods during which it transmits the output signal and Off Periods between said On Periods during which it transmits no signal, the transmitter circuit comprising an oscillator stage including a crystal oscillator having a predetermined nominal frequency and a first transistor connected to the crystal oscillator and to receive voltage from the voltage source, a frequency multiplying and amplifying stage connected to the oscillator stage and arranged to multiply and amplify said nominal frequency and a pulsing stage connected to the oscillator stage and comprising at least a second transistor effectively connected to the first transistor and to receive voltage from the low voltage source, the pulsing stage being arranged to produce a pulse during on Periods and no pulse during Off Period and to supply said pulses to the oscillator stage, in which the at least second transistor is switched off during the Off Periods and is switched on during the On Periods, and in which the ratio of the Off Periods to the On Periods is at least 15 to 1 and in which the active range of voltage variation in the pulsing circuit is between one third and two thirds of the supply voltage + or −20%.

11. A transmitter comprising a transmitter circuit for transmitting at a single frequency above about 150 MHz, the circuit comprising,
 (a) a battery power supply having terminals in the range from about 1.5 to about 6 volts nominal,
 (b) an oscillator stage including a crystal oscillator having a predetermined nominal frequency, a first transistor connected to the crystal oscillator and a first tuning means by which the frequency of the oscillator circuit can be fine tuned, said oscillator stage further connected to the terminals of the battery power supply,
 (c) a frequency doubling and amplifying stage connected to the oscillator stage and arranged to double and amplify the nominal frequency and having second tuning means by which the frequency of the doubling and amplifying stage can be fine tuned, said frequency doubling and amplifying stage further connected to the terminals of the battery power supply,
 (d) a pulsing stage connected to the oscillator stage for repetitively supplying a short, sharp pulse to the oscillator stage, said pulsing stage connected to the terminals of the battery power supply, and the transmitter including,
 (e) an antenna matching circuit connected to the frequency doubling and amplifying stage,
 (f) an antenna connected directly to the antenna matching circuit without an intervening transmission line, and,
 (g) a casing in which the power supply and transmitter circuit are located, the casing having a volume no greater than about 2500 cu mm.

12. A transmitter according to claim 11 in which the pulsing stage includes a pair of transistors connected to one another and effectively connected to the first transistor and having effective negative resistance and each of which is switched off when there is no output signal from the transmitter.

13. A transmitter circuit for transmitting an output signal at a single frequency in response to voltage from a low voltage source having terminals, the transmitter having On Periods during which it transmits the output signal and Off Periods between said On Periods during which it transmits no signal, the transmitter circuit comprising an oscillator stage including a crystal oscillator having a predetermined nominal frequency and a first transistor connected to the crystal oscillator and to receive voltage from the voltage source, a frequency doubling and amplifying stage connected to the oscillator stage and the terminals of the low voltage source to receive voltage, the pulsing stage being arranged to double and amplify said nominal frequency, a pulsing stage connected to the oscillator stage and arranged to produce pulses during On Periods and no pulses during Off Periods and to supply the pulses to the oscillator stage, the pulsing stage including a pair of transistors connected to one another and effectively connected to the first transistor and having effective negative resistance and each of which is switched off during the Off Periods.

14. A transmitter circuit according to claim 1 or claim 13 having an output terminal and including an antenna directly connected to the output terminal without the use of an intervening transmission line, and the transmitter circuit including an antenna matching stage matching the output impedance of the amplifier stage to antenna impedance in the range 10–30 ohms.

15. A transmitter comprising a transmitter circuit according to claim 1, 7, or 13 located in a casing and including a power supply as the voltage source comprising batteries having a nominal output in the range 3 to 4.5 volts, the casing, transmitter circuit and batteries together weighing no more than about 10 grams and having a volume no more than about 2500 cu mm.

* * * * *